United States Patent [19]
Daugherty et al.

[11] Patent Number: 5,765,125
[45] Date of Patent: Jun. 9, 1998

[54] DETECTION OF TONES WHILE MINIMIZING INCORRECT IDENTIFICATION OF OTHER SOUNDS AS TONES

[75] Inventors: Jeffrey Wayne Daugherty, Lisle; Richard Harry Ketchum, Wheaton, both of Ill.

[73] Assignee: Lucent Technologies Inc., Murray Hill, N.J.

[21] Appl. No.: 783,781

[22] Filed: Jan. 15, 1997

Related U.S. Application Data

[63] Continuation of Ser. No. 267,091, Jun. 28, 1994, abandoned.

[51] Int. Cl.$^6$ .................................................. H04M 1/50
[52] U.S. Cl. ................... 704/205; 704/219; 364/724.09; 370/526
[58] Field of Search .................. 379/386, 283, 379/351; 324/76.56; 364/724.09; 370/526; 395/2.14, 2.15, 2.16, 2.28; 384/14; 704/205, 206, 207, 219

[56] References Cited

U.S. PATENT DOCUMENTS

| | | | |
|---|---|---|---|
| 4,211,897 | 7/1980 | Ichikawa et al. | 179/84 |
| 4,689,760 | 8/1987 | Lee et al. | 370/110.3 |
| 4,782,523 | 11/1988 | Galand et al. | 379/386 |
| 5,136,531 | 8/1992 | McCaslin | 364/724.09 |
| 5,325,427 | 6/1994 | Dighe | 379/386 |

FOREIGN PATENT DOCUMENTS

| | | | |
|---|---|---|---|
| 0243561 | 4/1987 | European Pat. Off. | H04Q 1/457 |

OTHER PUBLICATIONS

"Algorithms for Multi–Channel DTMF Detection for the WE®DSP32 Family", S. L. Gay, J. Hartung and G. L. Smith, Int'l Conference on Acoustics, Speech and Signal Processing (ICASSP), vol. 2, 23–26 May, 1989, Glasgow, Scotland, pp. 1134–1137.

Digital Signal Processing, A.V. Oppenheim and R.W. Schafer, pp. 230–237, 287–289, Prentice–Hall Inc., Englewwod Cliffs, NJ, 1975.

"Linear Prediction Based DTMF Detection for the WE®DSP32 Digital Signal Processor Family", S.L. Gay, J. Hartung and G.L. Smith, Jun. 1989 pp. 1–19.

*Primary Examiner*—Allen R. MacDonald
*Assistant Examiner*—Donald Storm
*Attorney, Agent, or Firm*—Charles L. Warren

[57] ABSTRACT

A first validation circuit utilizes residual energy unaccounted for by a linear predictive coding model for a specified order of model as a criteria on which to make a validity determination of whether a valid tone or digit has been received. A second validation circuit operating in conjunction with the first validation circuit utilizes discrete Fourier transforms at the center and adjacent frequencies to energy peaks associated with tones. A ratio of the peak energy to the adjacent energies is utilized in combination with corresponding thresholds to make a validity determination. The combination of the first and second validation circuit provides a high level of confidence that a particular tone or digit has been detected.

33 Claims, 4 Drawing Sheets

|      | $f_5$ | $f_6$ | $f_7$ | $f_8$ |
|------|-------|-------|-------|-------|
| $f_1$ | 1 | 2 | 3 | A |
| $f_2$ | 4 | 5 | 6 | B |
| $f_3$ | 7 | 8 | 9 | C |
| $f_4$ | * | 0 | # | D |

DETECTION OF TONES WHILE MINIMIZING INCORRECT IDENTIFICATION OF OTHER SOUNDS AS TONES

This application is a continuation application Ser. No. 08/267,091, filed on Jun. 28, 1994, now abandoned.

BACKGROUND OF THE INVENTION

This invention relates to tone detectors.

Tones are used for a variety of purposes in telecommunications systems. Dual tone multifrequency (DTMF) tones or signals are utilized by telephone subscribers to enter the telephone number of a called party. Additionally, DTMF tones are used to identify certain parameters or features desired to be utilized either prior to, during, or after the establishment of a telephone connection to a called party. A private branch exchange (PBX) or the central office serving a subscriber recognizes DTMF tones entered by subscribers for both calling and control purposes.

Speech, music, data, or other sounds received by a tone detector may cause the detector to falsely report that a tone has been received. The false detection of a tone due to other sound input is referred to as a "talk-off" condition. Failures such as incorrect control or dialing sequences result from such false detections. A variety of previous tone detectors have been utilized with varying degrees of success, depending upon the application and the type of tones to be detected. For example, a tone detector having an improved ability to reject talk-off conditions is described in U.S. Pat. No. 5,325,427. Although advances in addressing the talk-off problem have been made, there still exists a need for a tone detection method and apparatus which even further minimizes this problem. As more and more capabilities become available which are responsive to tone signaling, even greater emphasis is being placed on the ability to correctly detect the presence of a tone or DTMF signal for control and signaling purposes. As more use is made of such signaling techniques, false detections become an ever increasing concern. Thus, there exists a need for an improved apparatus and method for detecting tones which is substantially immune to talk-off and false detections.

SUMMARY OF THE INVENTION

It is an object of the present invention to provide an apparatus and method which further minimizes the above described talk-off and false detection problems.

In accordance with an embodiment of the present invention, linear predictive coding (LPC) coefficients are calculated for information contained in a frame of samples of an input signal which may carry a tone to be detected. The LPC coefficients are calculated for a series of models up to a predetermined number of prior samples such as for a model using twelve prior samples. If the residual energy, i.e. energy unaccounted for by the model, is less than a predetermined amount such as 1 per cent, and the order of the model is less than a predetermined level such as less than the ninth order, a determination is made that the frame contains a valid tone. In the embodiment of the present invention an initial determination is preferably made as to whether a tone at a particular frequency is present prior to the LPC coefficient calculations. This is desirable in order to minimize calculation complexity and calculating power needed to implement the technique; however, it will be apparent that this technique could be utilized without the previously made tone determination at the expense of computational complexity or power.

Another aspect in accordance with an embodiment of this invention resides in a further tone determination technique in which a discrete Fourier transform is performed on a predetermined highest order model for which LPC coefficients are calculated. In accordance with the preferred embodiment a discrete Fourier transform (DFT) analysis is possible since a predetermined identification of the tone and its frequency has been previously made. Preferably, three DFT calculations are made: one at an energy peak of the tone and two other DFT's made at spaced apart frequencies equidistance from the peak frequency such as by 2.5 per cent. The two valley or side DFT responses are added together and compared with the peak DFT value. If this comparison exceeds a predetermined minimum, a determination is made that a tone exists and a valid tone is determined to have been received.

In the case of dual tone multifrequency (DTMF) tones, corresponding peak and valleys are computed for each of the two tones which will be simultaneously present if a DTMF tone is present. In this case, comparisons of the peaks with the valleys for the high and low tones of a DTMF signal must both exceed a predetermined minimum in order to have a validity determination made.

DETAILED DESCRIPTION

Figure 1:
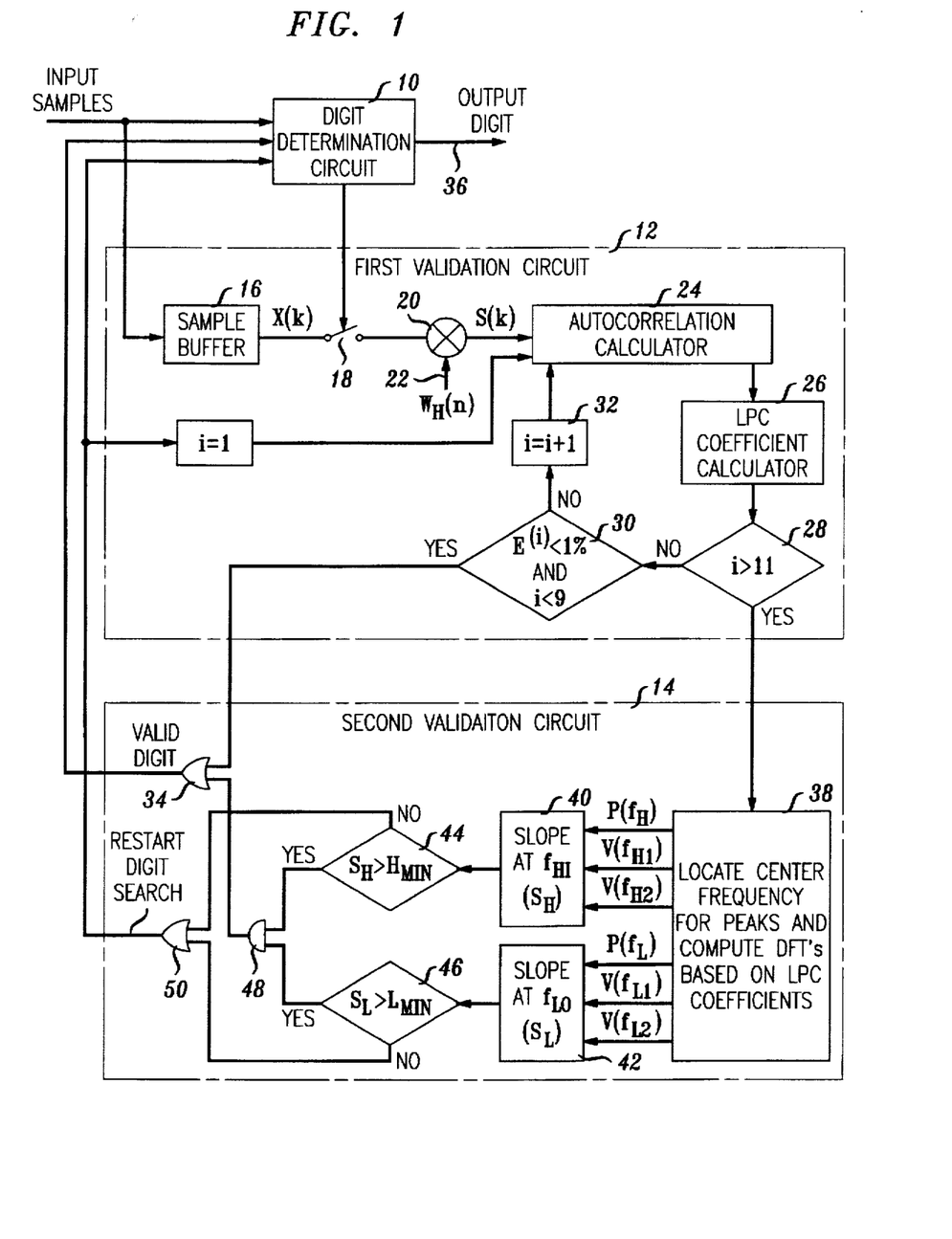
FIG. 1 is a block diagram illustrating an embodiment of a tone detector in accordance with the present invention.
Figure 7:
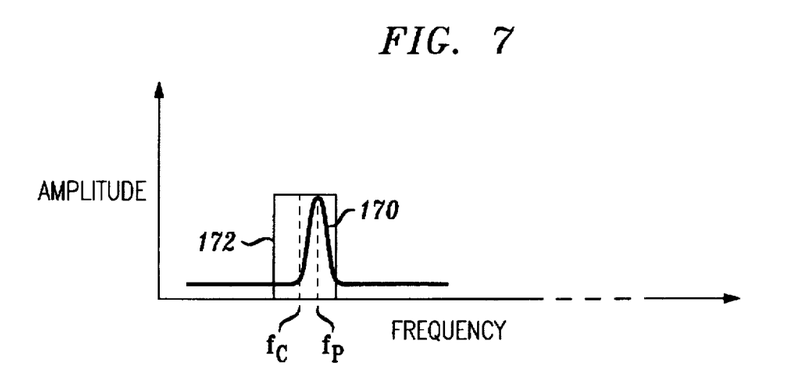
FIG. 7 is a graph which illustrates a detection window which is not centered relative to a tone to be detected.

FIG. 1 is a block diagram illustrating an embodiment in accordance with the present invention which may be viewed as containing three sections: a digit determination circuit 10, a first digit validation circuit 12, and a second digit validation circuit 14. The digit determination circuit 10 receives digitized samples of a signal such as carried on a communication channel in a telecommunication network in which tones are utilized for signaling or command purposes. For example, the tones could consist of a single audio frequency tone at a given frequency or could consist of DTMF tones such as commonly used in the telephony network. As shown in FIG. 7, DTMF tones consist of pairs of audio frequency tones simultaneously transmitted at respective frequencies. The circuit 10 makes an initial determination of whether a DTMF signal representing a digit has been received.

The illustrative embodiment of the first validation circuit 12 includes a sample buffer 16 which stores a frame of digitized input samples. This frame at least includes the same frame upon which digit determination circuit 10 made a corresponding determination. A frame of input samples is represented using LPC coefficients. The spectral envelope of the LPC function closely matches that of the original signal.

The LPC function can be defined using the following equation:

$$s_k = \left( \sum_{n=1}^{N} a_n s_{k-n} \right) + e_k$$

where $s_k$ is the signal at time k;

$a_n$ is the LPC coefficient for the nth prior sample;

$s_{k-n}$ is the signal at time k-n, i.e. the nth prior sample;

$e_k$ is the prediction error or residual at time k.

The function in parentheses in the above equation represents the LPC function and $e_k$ represents the energy contained in the sampled signal that is not accounted for by the LPC model.

If digit determination circuit 10 made a positive decision, i.e. that one of a plurality of predetermined tones or digits was received, sample gate 18 is closed, thereby transferring the stored samples in buffer 16 to multiplier 20. In the illustrative embodiment, 160 samples comprises one frame. The other input 22 to multipler 20 may consist of a raised cosine function which, when multiplied by the input samples, functions as a Hamming window that smooths the effects of isolating the 160 samples from the continuous data stream. For example, the raised cosine function may comprise:

$$W_H(k) = 0.54 - 0.46 \cos(2\pi k/159)$$

where k=0,1,..., 159.

The output of multiplier 20 which consists of weighted samples is provided as an input to the autocorrelation calculator 24 which computes a single autocorrelation value for a lag of i samples based on the Hamming-windowed data. Designating the input sequence to autocorrelation calculator 24 as $s_k$, the autocorrelation value "r" for a lag of i samples is defined by:

$$r_i = \sum_{k=0}^{159-i} s_k s_{k+i}$$

where k identifies an incoming sample;

i represents the power of the LPC model which ranges from 1 to 12 in the illustrative embodiment. However, only a single autocorrelation value, i.e. a given power, is calculated at a time. The autocorrelation values are preferably maintained in an array. Since the autocorrelation calculation is typically the most computational intensive part of producing a set of LPC coefficients, calculating the value of one lag at a time and then evaluating the fit of the LPC model produced with that value can minimize the total number of computations if a fit of a desired value (which will be discussed below) is determined prior to reaching the maximum order of the model, such as twelfth order in the illustrative embodiment.

The LPC coefficient calculator 26 receives the autocorrelation values determined by autocorrelation calculator 24 as inputs, and preferably, calculates the reflection coefficient k of index i based on the first step of the Levinson-Durbin recursive solution for the Yule-Walker normal equations defined as:

$$k_i = \left( r_i - \sum_{j=1}^{i-1} a_j^{(i-1)} r_{i-j} \right) / E^{(i-1)}$$

where k is the reflection coefficient for the ith order;

r is the autocorrelation value for the referenced subscript;

a is the jth element of the set of LPC coefficients of the order i-1;

E is the square of the residual error of the LPC system of order i-1.

As was true with the autocorrelation values, only one reflection coefficient is calculated for each order, i.e. for each ith iteration. Once calculated, these values are stored in an array.

The LPC coefficient calculator 26 further calculates the a(j) coefficients based upon the following formulas:

$$a_j^{(i)} = k_i$$

for j=i, and $$a_j^{(i)} = a_j^{(i-1)} - k_i a_{i-j}^{(i-1)}$$

for j=1, 2, ..., i-1.

The autocorrelation values and the LPC coefficients generated by elements 24 and 26, respectively, each only generate the corresponding values for one level or order of model at a time. A decision step 28 determines if the ith order is greater than 11. A NO response leads to a further determination at step 30 wherein a determination is made of whether the residual energy is less than 1 per cent and if the ith order is less than 9. A residual energy within the range of 0.5% to 4% is believed suitable, with 0.5% to 2% being preferred. An ith order of 4 to 12 could be used although a range of 6 to 9 is preferred. The residual energy may be calculated as:

$$E^{(i)} = (1 - K_i^2) E^{(i-1)}$$

where $E^{(i)}$ is the residual energy not accounted for by the LPC model for the ith order;

k is the coefficient as defined above for the ith order.

The residual energy for a zero order LPC system, $E^{(0)}$, is the energy of the Hamming-Windowed data as calculated by the auto-correlation calculator 24. The above residual energy thresholds are preferably percentages of $E^{(0)}$.

A NO determination by determination step 30 results in incrementing the order by 1 as represented by block 32 and calculating the next higher order LPC parameters. A YES determination by determination step 30 indicates that the criteria have been met which provides an input to OR gate 34. The output of OR gate 34 provides a digit validation signal which is coupled to digit determination circuit 10 and causes circuit 10 to output the previously considered digit on output line 36 to other circuitry in the telecommunication system which utilizes the digit to produce a result or action. For example, the output digit may represent a subscriber's input of a DTMF tone which is utilized as an input dialing digit as part of a telephone number or may signify a subscriber's choice to receive a service, or in response to an audible menu presented to the subscriber.

With regard to the first validation circuit 12 illustrated in FIG. 1, testing has resulted in empirical data which led to the choices of the indicated criteria for decision steps 28 and 30. Although the indicated values are preferred, it will be apparent to those skilled in the art that choices of the parameters of step 30 (the ith order and the residual energy $E^{(i)}$) may vary within ranges and still produce results which are desirable in accordance with the present invention. A residual energy threshold between 0.5 per cent and 4 per cent may be utilized, and the ith threshold may range between 4 and 12. A further preferred range for the ith order exists between 6 and 9, and between 0.5 per cent and 2 per cent for the residual energy threshold.

The benefit of making an earlier validation determination by first validation circuit 12 without reaching the maximum ith order provides computational efficiencies by eliminating computations for higher order models and eliminates, in accordance with the present invention, action by the second validation circuit 14. It will be noted that the threshold for the ith order in step 30 (i<9) is less than the maximum ith order indicated in step 28 (i>11). It has been determined that a residual energy level specified in step 30 may be undesirably achieved if the ith order is permitted to exceed a maximum value and thus, provide an incorrect validity determination. For higher order models, a better fit with data can be accomplished. Thus, in accordance with the present invention, it is desired to establish the ith threshold in step 30 to be less than, and preferably, more than two orders less than, the order required for a YES determination by step 28.

The second validation circuit 14 includes a circuit 38 which locates the center frequency for the peak energy response within a given window about the previously determined known center frequency and computes a DFT analysis on the above calculated model based on LPC coefficients. The calculation by circuit 38 is made based upon the twelfth order, i.e. the minimum granularity needed for a YES by decision step 28. Thus, in accordance with illustrative embodiment, circuit 38 performs its operations based on a twelfth order LPC model.

As will be described below with regard to FIGS. 6 and 7, circuit 38 preferably locates the center of an energy response within a window about a predetermined center frequency defined for the corresponding tone. It will be appreciated by those skilled in the art that a build-up of tolerances may result in the peak energy for an anticipated frequency occurring within a range about the defined frequency. An objective of circuit 38 is to determine within a limiting window where the peak energy resides, should it be other than at the correct defined frequency for the tone. This defined frequency within the window of the peak response is then utilized for the peak computation of the DFT.

In the illustrative embodiment, DFT calculations are preferably made on each side of the determined frequency of peak energy response. In the example in which a DTMF tone is to be detected, two sets of outputs exist from circuit 38 wherein each set consists of a value indicative of the energy at the peak and corresponding energy values determined above and below the frequency of the peak energy, such as at 2.5% of the peak frequency above and below the peak frequency. Although valley energies at ±2.5% are well suited for this application, valley energies at ±0.5% to 5% could be utilized, with ±1% to 3% being especially suited. Circuit 40 receives the peak and two valley energy calculations resulting from the DFT for the high tone and circuit 42 receives the peak and two corresponding valley energies for a corresponding low frequency tone. In accordance with the illustrative embodiment, circuit 40 adds the energies calculated for the two valley values and divides the result into the energy associated with the peak energy value. Circuit 42 makes a similar calculation with regard to the other DTMF tone so that each of circuits 40 and 42 provide a value output representative of a comparison between the energy at the peak frequency relative to the energy at the determined valleys. Determination steps 44 and 46 provide a determination based on the output calculation from circuits 40 and 42, respectively. The value output by circuits 40 and 42 generally relates to the slope of the peak energies relative to the values. A predetermined minimum value for the respective high and low frequency tones as determined by steps 44 and 46, respectively, must be exceeded for the output of determination steps 44 and 46 to yield a YES which is provided as an input to AND gate 48. The output of the AND gate is received as an input by OR gate 34. The OR gate provides a valid digit determination output which is transmitted to digit determination circuit 10 which then outputs the preliminarily determined digit on output 36 as a valid digit. A NO determination by either of determination steps 44 or 46 results in OR gate 50 providing an output to digit determination circuit 10 causing a restart and is indicative that the preliminarily determined digit thought to be present by circuit 10 was not validated and thus, will not be output on output 36. An output from OR gate 50 thus, causes re-initialization causing digit determination circuit 10 to attempt to look for the presence of possibly valid digits or tones in later frames of data.

The corresponding minimum values used in steps 44 and 46 for the detection of DTMF digits is provided in the table below.

TABLE

| DTMF Digit | Low Tone Minimum "Slope" | High Tone Minimum "Slope" |
|---|---|---|
| 1 | 3.6 | 6.3 |
| 2 | 6.3 | 6.3 |
| 3 | 4.2 | 7.7 |
| 4 | 6.3 | 7.7 |
| 5 | 3.6 | 4.1 |
| 6 | 8.3 | 7.7 |
| 7 | 6.7 | 7.7 |
| 8 | 8.3 | 6.3 |
| 9 | 3.6 | 3.4 |
| * | 6.3 | 5.0 |
| 0 | 10.0 | 7.7 |
| # | 8.3 | 7.7 |
| A | 2.0 | 2.0 |
| B | 2.5 | 2.5 |
| C | 8.3 | 6.3 |
| D | 6.7 | 7.7 |

The above table is based on empirical information utilized to make determinations of whether corresponding DTMF digits should be determined to be valid in accordance with the present invention. It will be understood that these slopes were for the particular implementation which includes a twelfth order LPC model fit with corresponding DFT calculations based on a centered peak frequency output with corresponding valleys separated 2.5 per cent each side of the peak frequency.

The second validation circuit 14 provides a degree of granularity of decision making which exceeds the first validation circuit 12. It will be apparent to those skilled in the art that the first validation circuit is especially useful in decreasing the computational complexity and decision making required, that is, eliminating the need for the second validation circuit to act upon the data. The decision associated with a YES output by decision step 30 could be eliminated with each frame being validated only by the second validation circuit 14. However, a substantial increase in computational complexity/power would be required if the first validation circuit were eliminated. On a statistical basis, a substantial number of tones are validated as being valid without requiring action by the second validation circuit. It is believed to be advantageous to implement the first validation circuit in conjunction with the second validation circuit since the parameters to be utilized by the first validation circuit are generated as interim steps in reaching the parameters needed for the higher order second validation circuit. Thus, efficiencies and economies are best served by utilizing the first validation circuit in combination with the second validation circuit.

Figure 2:
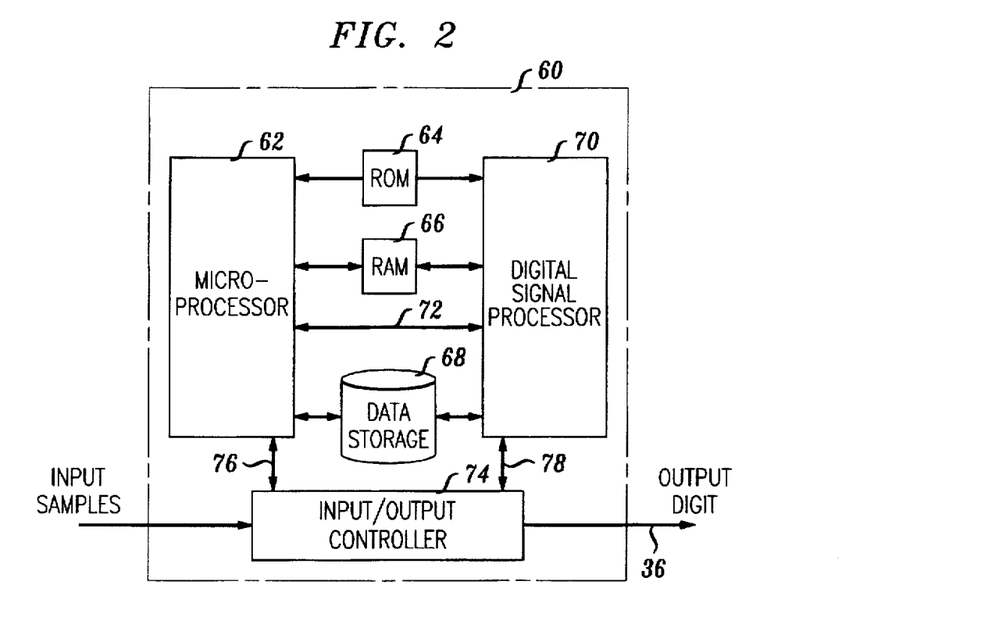
FIG. 2 is a block diagram of a computer architecture which may be utilized to implement an embodiment of the tone detector in accordance with the present invention.

FIG. 2 illustrates a block diagram of a computer architecture 60 for implementing the present invention. It will be apparent to those skilled in the art that the present invention can be implemented by specific hardware circuits, specialized integrated circuits or by a computer architecture 60 such as shown in FIG. 2. A microprocessor 62 is supported by read-only memory (ROM) 64, random access memory (RAM) 66 and a nonvolatile data storage element 68 which may comprise a hard drive. A digital signal processor (DSP) 70 is also supported by ROM 64, RAM 66, and data storage element 68. A direct communication channel or bus 72 preferably couples microprocessor 62 and DSP 70 to allow the rapid transmission of data to each other. It will be apparent to those skilled in the art that DSP 70 is especially suited for carrying out mathematical computations utilized in accordance with the present invention. An input/output controller 74 is coupled by communication line 76 to microprocessor 62 and communication line 78 to DSP 70. The input/output controller 74 provides an input/output interface among the microprocessor 62 and DSP 70, the digital input samples received as inputs, and the output line 36 upon which valid digits are transmitted. A stored program can implement the actions described for the embodiment of the present invention.

Figure 3:
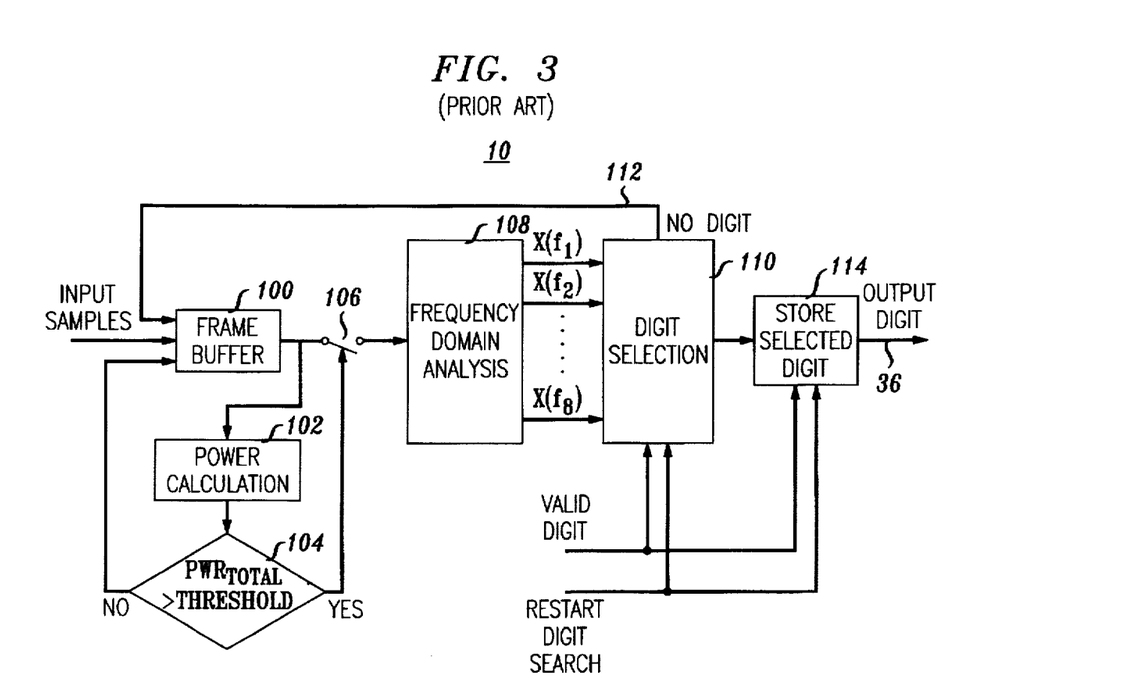
FIG. 3 is a block diagram of the digit determination circuit as shown in FIG. 1.

FIG. 3 is a block diagram that shows a digit determination circuit 10 as shown in FIG. 1. A frame buffer 100 stores a frame of input samples. A power calculation circuit 102 calculates the total power contained in the samples contained in the current frame and provides the computed power to decision step 104. If the calculated total power exceeds a predetermined threshold, determination step 104 results in a YES decision which causes the sample gate 106 to close, thereby transferring the current samples in the frame to the frequency domain analysis circuit 108. A No determination by step 104 results in frame buffer 100 being reset and receiving a new frame of input samples upon which another total power calculation is made by circuit 102. Thus, this portion of the digit determination circuit 10 functions as a threshold determination to determine if sufficient power exists within the samples of a frame to warrant further analysis.

The frequency domain analysis circuit 108 may comprise DFT calculations at the eight frequencies associated with DTMF tones. The analysis circuit 108 provides 8 outputs $X(f_1) \ldots X(f_8)$ outputs each representing a calculated energy at each of the eight frequencies associated with the eight possible DTMF frequencies. A digit selection circuit 110 receives the eight outputs from analysis circuit 108 and provides a comparison of each of the eight outputs to a predetermined threshold in order to make a determination of which, if any, DTMF digit is present in the current frame. If no digit is determined to be present, an output signal on communication line 112 from digit selection circuit 110 is transmitted to frame buffer 100 causing the buffer to be reset and to initiate processing of the next frame of samples. If the digit selection circuit 110 determines that a digit is present, the digit is identified and transmitted to circuit 114 which may comprise a register which stores the digit detected. However, circuit 114 does not transmit the digit to output line 36 until receiving a valid digit signal generated by OR gate 34 of FIG. 1. Upon the first and second validation circuits 12 and 14 of FIG. 1 processing the preliminary determination stored in circuit 114, either a valid digit signal will be generated or a restart digit search signal will be generated by OR gate 50. Receipt of the valid digit signal by circuit 114 causes the stored digit to be transmitted on output line 36. Then following the transmission of this digit, the circuitry is reset to process another frame of data. If the restart digit search signal is generated by NOR gate 50, the digit stored in circuit 114 is discarded and not transmitted on output line 36. The restart digit search signal as well as the valid digit signals may be coupled to digit selection circuit 110 which is utilized to initiate a reset of the circuitry including frame buffer 100 to receive the next frame of data.

It will be understood by those skilled in the art that the digit determination circuit 10 may comprise a variety of types of circuitry other than the exemplary circuit shown in FIG. 3. For example, the digit determination circuit 10 may comprise a tone detector described in U.S. Pat. No. 5,325,427 entitled "Apparatus and Robust Method for Detecting Tones" which is assigned to the assignee of the present invention. This patent is incorporated herein by reference.

Figure 4:
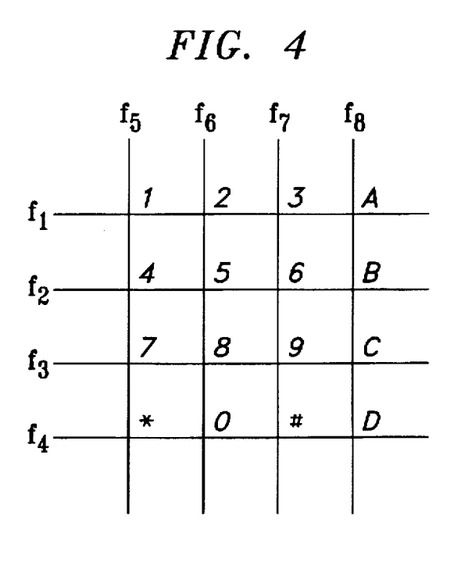
FIG. 4 provides a visual depiction of the relationship of DTMF tones showing the use of one low frequency and one high frequency tone to generate up to 16 DTMF signals.

FIG. 4 illustrates a graphical representation of a 4×4 matrix telephone keypad which may be utilized to encode 16 DTMF symbols. It will be apparent to those skilled in the art that the fourth column is normally omitted on a standard telephone set. The rows represent the lower frequency tones of $f_1 \ldots f_4$ while the columns represent the higher frequency tones $f_5 \ldots f_8$. The frequencies assigned to the low tones varies from 697 hertz (Hz) for $f_1$ to 941 Hz for $f_4$; the higher frequency tones range from 1209 Hz for $f_5$ to 1633 Hz for $f_8$. Use of the buttons on a standard telephone set results in the transmission of the two corresponding tones indicated by the cross section of the corresponding row and column lines illustrated in FIG. 4.

Figure 5:
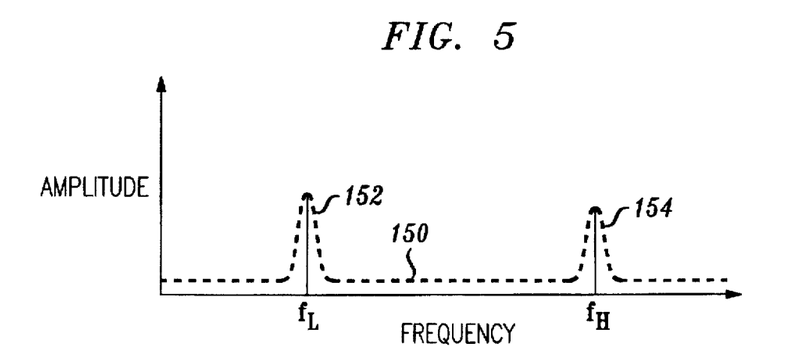
FIG. 5 is a graphical representation showing a DTMF tone which consists of a low frequency and high frequency tone.

FIG. 5 illustrates a graph in which energy amplitude is shown versus frequency for the audible frequencies that include the DTMF tone frequencies. In the illustrative graph an overall response is illustrated by the line 150 which includes a lower frequency peak 152 and a higher frequency peak 154. Each of these peaks are centered about a lower frequency $f_l$ and a higher frequency $f_h$, respectively. This graph illustrates an idealized response for a received characteristic of a DTMF digit in which the lower frequency corresponds to the peak 152 and the higher frequency tone corresponds to the peak 154.

Figure 6:
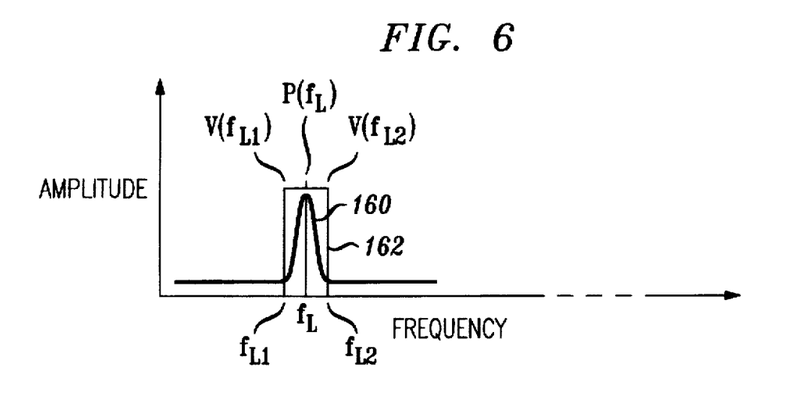
FIG. 6 is a graph which illustrates a detection window centered about a tone.

FIG. 6 illustrates a graph similar to FIG. 5 in which only a single energy peak 160 at a frequency $f_L$ is shown. A window 162 which, in the illustrative embodiment, is equidistant or centered about the frequency of the peak is shown. In the preferred embodiment, the window represents a range about the peak that may comprise ±0.5% to 5% of the frequency $f_L$, with 2.5% being a preferred window. The lower and upper frequencies of the window are defined by frequencies $f_{L1}$ and $f_{L2}$, respectively. This graph illustrates the peak energy at $P(f_1)$ as provided to slope circuit 42 as well as valley energy determinations $V(f_{L1})$ and $V(f_{L2})$ which correspond to the lower and upper energy determinations at the corresponding lower and upper frequencies of window 162. It is the difference between the energy levels at the peak and the edges of the window 162 which are utilized in making the determination at step 46 as to whether a valid tone has been received in the second validation circuit 14. It will be apparent to those skilled in the art that a substantially identical technique is utilized for the upper frequency tone which would be associated with slope circuit 40 and a resulting determination being made by step 44.

FIG. 7 illustrates a graph of energy amplitude versus frequency in which a peak energy 170 is shown relative to a window 172. In the illustrative example, the frequency $f_p$ of the energy peak does not coincide with the frequency $f_c$ which represents the center frequency of the window 172. This graphically represents a case in which a received tone does not have an energy peak at exactly the frequency specified for the tone. This may occur because of various factors including a tolerance build-up resulting in the generation of the tone within a range of its specified frequency. In accordance with the present invention, it is preferred that the discrete Fourier transforms be performed about the actual frequency corresponding to the peak energy $f_p$ as opposed to the frequency $f_c$ at which the tone should have occurred. In circuit 38 as shown in FIG. 1, a technique is preferably employed to determine the actual peak frequency $f_p$ within a range of frequencies defined by the window 172. It will be apparent to those skilled in the art that a plurality of iterative calculations over a set of frequencies within window 172 can be utilized to determine where the maximum energy level exists. Alternative techniques can be employed which utilize the mathematical convergence principle in order to determine the frequency at which the maximum energy occurs. In accordance with the present invention, if the peak energy lies within window 172, after determining the frequency $f_p$ of this peak energy, the window 172 is moved or shifted so that the center frequency $f_c$ of the window coincides with the center frequency of the peak $f_p$. This permits a better recognition of tones where such tones are not transmitted with peak energies occurring at exactly their defined frequency.

In accordance with an embodiment of the present invention, first and second validation circuits are advantageously employed to validate the determination of a received tone (digit). A validation by the first validation circuit eliminates the need for further processing by the second validation circuit and thus, minimizes the computational complexity and resources required. For those cases in which the first validation circuit cannot provide a validation determination, the second validation circuit provides a finer resolution evaluation of whether a valid tone has been received. It will be apparent that the second validation circuit could be used without the first validation circuit at the expense of additional computational complexity and resources. In accordance with the present invention, embodiments may comprise customized integrated circuits, hardware circuitry, or implementation in a computer architecture such as shown in FIG. 2. A combination of software and hardware can be utilized to implement the techniques in accordance with the present invention.

Although an embodiment of the present invention has been described and shown in the drawings, the scope of the invention is defined by the claims which follow.

We claim:

1. A computer implemented method for validating the detection of at least one tone having a first frequency comprising the steps of:

(a) receiving a frame of samples of input signal;

(b) computing linear predictive coding (LPC) coefficients for a function of order N based on said frame of samples representing said tone, said function representing the energy of said frame of samples versus time, where N is an integer greater than zero and less than a predetermined upper threshold number;

(c) calculating a residual energy of said function of order N;

(d) determining if said residual energy of the N order function is below a first energy threshold:

(e) upon determining said residual energy of the N order function not to be below a first energy threshold where N is less than said predetermined upper threshold number, incrementing N to the next higher order and returning to step (b);

(f) upon determining said residual energy of the N order function to be below a first energy threshold where N is less than said predetermined upper threshold number, validating the detection of said at least one tone and ceasing the computing of LPC coefficients for functions higher than the current $N^{th}$ order.

2. An apparatus for validating the detection of at least one tone having a first frequency comprising:

means for receiving a frame of samples of an input signal in which said one tone is to be detected;

means for computing linear predictive coding (LPC) coefficients for a series of N order functions based on said frame of samples, each function representing the energy of said frame of samples versus time, where N is an integer greater than zero and less than a predetermined upper threshold number;

means for calculating a residual energy for said functions so that the residual energy for the function of order N is calculated before LPC coefficients for the function of order N+1 are computed;

means for validating the detection of said at least one tone and ceasing the computing of LPC coefficients for higher order N functions upon determining said residual energy of one of the N order functions to be below a first energy threshold.

3. A computer implemented method for validating the detection of at least one tone having a first frequency comprising the steps of:

(a) receiving a frame of samples of an input signal;

(b) computing linear predictive coding (LPC) coefficients for a function of order N based on said frame of samples representing said tone, said function representing the energy of said frame of samples versus time, where N is an integer having an initial value, N being greater than zero and less than a predetermined upper threshold number;

(c) calculating a residual energy of said function for N;

(d) determining that said at least one tone is valid if said residual energy is below a first energy threshold and if N is less than said predetermined upper threshold number;

(e) ceasing the computing of the LPC coefficients for functions of higher orders of N upon a validation determination by step (d);

(f) if said at least one tone is not determined valid and if N is less than said predetermined upper threshold number, incrementing N and returning to step (b).

4. The method according to claim 3 wherein dual tone multifrequency (DTMF) tones are presented for detection and said at least one tone corresponds to one of the tones in the DTMF tones.

5. The method according to claim 3 further comprising the steps of:

making an initial determination of whether a tone is present;

if said initial determination is that a tone is present, determining the frequency of said tone initially determined to be present.

6. The method according to claim 3 wherein said predetermined upper threshold number is within a range between 4 and 12.

7. The method according to claim 6 wherein said first energy threshold is within a range between 0.5% and 4% of total frame energy.

8. The method according to claim 3 wherein said predetermined upper threshold number is within a range between 4 and 12.

9. The method according to claim 8 wherein said first energy threshold is within a range between 0.5% and 4% of total frame energy.

10. The method according to claim 3 wherein said predetermined upper threshold number is within a range between 6 and 9, and said first energy threshold is within a range between 0.5% and 2% of total frame energy.

11. The method according to claim 3 wherein said predetermined upper threshold number is within a range between 6 and 9, and said first energy threshold is within a range between 0.5% and 2% of total frame energy.

12. The method according to claim 3 wherein said predetermined upper threshold number is within a range between 6 and 9, and said first energy threshold is approximately 1% of total frame energy.

13. The method according to claim 3 further comprising the steps of:

performing a first Fourier transform of said function at said first frequency to obtain a frequency domain representation of a first energy of said function at said first frequency;

performing a second Fourier transform of said function at a second frequency to obtain a frequency domain representation of a second energy of said function at said second frequency, said second frequency separated from said first frequency by a predetermined amount;

making a further determination of whether said at least one tone is valid based on a comparison of said first and second energies relative to predetermined first threshold.

14. The method according to claim 13 wherein dual tone multifrequency (DTMF) tones are presented for detection and said at least one tone corresponds to one of the tones in the DTMF tones.

15. The method according to claim 13 further comprising the steps of:

making an initial determination of whether a tone is present;

if said initial determination is that a tone is present, determining the frequency of said tone initially determined to be present.

16. The method according to claim 13 wherein said first and second Fourier transforms are performed only for $M^{th}$ order functions where M is greater than said predetermined upper threshold number.

17. The method according to claim 13 further comprising the steps of:

performing a third Fourier transform of said function at a third frequency to obtain a frequency domain representation of a third energy of said function at said third frequency, said second and third frequencies separated substantially equidistant from said first frequency by said predetermined amount;

generating a first value based on a comparison of said first energy with said second and third energies;

making said further determination of whether said at least one tone is valid based on said first value exceeding said predetermined first threshold.

18. The method according to claim 13 wherein said predetermined amount is within a range of 0.5% to 5.0% of said first frequency.

19. The method according to claim 18 wherein said predetermined amount is within a range of 1.0% to 3.0% of said first frequency.

20. An apparatus for validating the detection of at least one tone having a first frequency comprising:

means for receiving a frame of samples of an input signal in which said one tone is to be detected;

means for computing linear predictive coding (LPC) coefficients for an $N^{th}$ order function based on said frame of samples, said function representing the energy of said frame of samples versus time, where N is an integer greater than 1 and less than a predetermined upper threshold number;

means for calculating a residual energy of said function;

means for determining that said at least one tone is valid if said residual energy is below a first energy threshold and if N is less than said predetermined upper threshold number means for incrementing N if said at least one tone is not determined valid and if N is less than said predetermined upper threshold number;

means for computing linear predictive coding (LPC) coefficients for an incremented $N^{th}$ order function based on said frame of samples representing said tone, said function representing the energy of said frame of samples versus time;

means for calculating the residual energy of said incremental $N^{th}$ order function;

means for determining that said at least one tone is valid if said residual energy of said incremented $N^{th}$ order function is below said first energy threshold and if N is less than said predetermined upper threshold number, said computing means ceasing the computing of the LPC coefficients for functions of orders higher than the incremented $N^{th}$ order upon a validation determination by the determining means.

21. The apparatus according to claim 20 wherein dual tone multifrequency (DTMF) tones are presented for detection and said at least one tone corresponds to one of the tones in the DTMF tones.

22. The apparatus according to claim 20 further comprising:

tone detector that makes an initial determination of whether a tone is present;

if said tone detector determines that a tone is present, said tone further determining the frequency of said tone.

23. The apparatus according to claim 20 wherein said predetermined upper threshold number is within a range between 6 and 9 and said first energy threshold is within a range between 0.5% and 2% of total frame energy.

24. The apparatus according to claim 20 further comprising means, responsive to said at least one tone being determined not valid and N equaling said predetermined upper threshold number, for computing further linear predictive coding (LPC) coefficients for an $M^{th}$ order function based on said frame of samples representing said tone, said function representing the energy of said frame of samples, and M being an integer greater than said predetermined upper threshold number.

25. The apparatus according to claim 24 wherein M=X plus said predetermined upper threshold numbers, and X is a number within the range of 1 and 6.

26. The apparatus according to claim 25 wherein X>2.

27. The apparatus according to claim 24 further comprising:

means for performing a first Fourier transform of said function at said first frequency to obtain a frequency domain representation of a first energy of said function at said first frequency;

means for performing a second Fourier transform of said function at a second frequency to obtain a frequency domain representation of a second energy of said function at said second frequency, said second frequency separated from said first frequency by a predetermined amount;

means for making a further determination of whether said at least one tone is valid based on a comparison of said first and second energies relative to a predetermined first threshold.

28. The apparatus according to claim 27 wherein dual tone multifrequency (DTMF) tones are presented for detection and said at least one tone corresponds to one of the tones in the DTMF tones.

29. The apparatus according to claim 27 further comprising:

tone detector that makes an initial determination of whether a tone is present;

if said tone detector determines that a tone is present, said tone detector further determining the frequency of said tone initially determined to be present.

30. The apparatus according to claim 27 wherein said means for performing the first and second Fourier transforms performs said transforms for $M^{th}$ order functions where M is greater than said predetermined upper threshold number.

31. The apparatus according to claim 27 further comprising:

means for performing a third Fourier transform of said function at a third frequency to obtain a frequency domain representation of a third energy of said function at said third frequency, said second and third frequencies separated substantially equidistant from said first frequency by said predetermined amount;

means for generating a first value based on a comparison of said first energy with said second and third energies;

means for making said further determination of whether said at least one tone is valid based on said first value exceeding said predetermined first threshold.

32. The apparatus according to claim 31 wherein said predetermined amount is within a range of 0.5% to 5.0% of said first frequency.

33. The apparatus according to claim 32 wherein said predetermined amount is within a range of 1.0% to 3.0% of said first frequency.

* * * * *